L. G. PEEL.
Coupling for Buggies.
No. 89,336. Patented April 27, 1869.
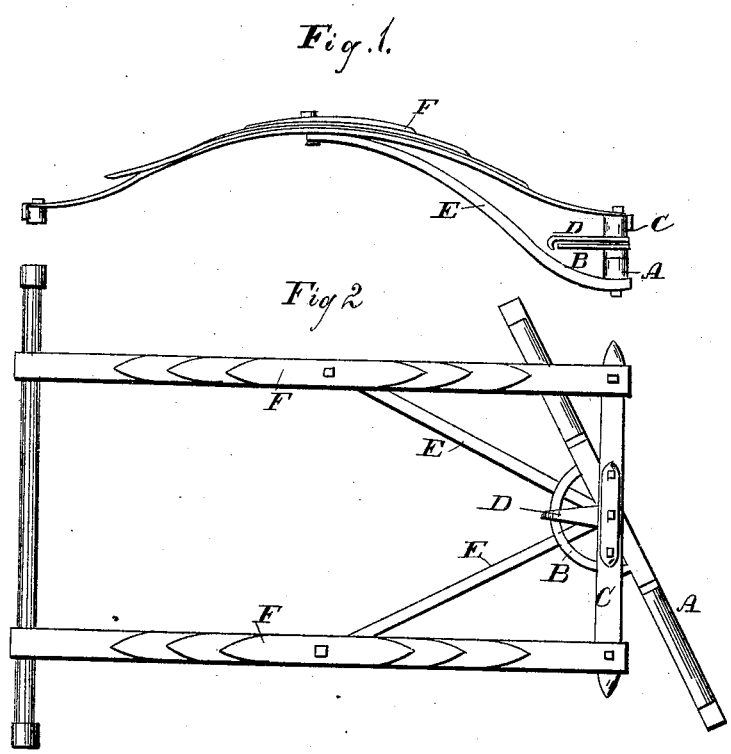

LAWSON G. PEEL, OF PRESTON, GEORGIA.

Letters Patent No. 89,336, dated April 27, 1869.

IMPROVEMENT IN COUPLINGS FOR BUGGIES.

The Schedule referred to in these Letters Patent and making part of the same

*To all whom it may concern:*

Be it known that I, LAWSON G. PEEL, of Preston, in the county of Webster, and in the State of Georgia, have invented certain new and useful Improvements in "Coupling for Buggies;" and do hereby declare the following to be a full, clear, and exact description thereof, reference being had to the accompanying drawings, and to the letters of reference marked thereon.

The nature of my invention consists in the construction and general arrangement of a coupling for buggies, which will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is a side view, and
Figure 2, a plan view.

A represents the front axle, to the upper side of which the fifth-wheel B is firmly secured.

From the centre of the under side of the front hound, C, a bar, D, extends toward the rear a suitable distance.

This bar is bent at its rear end, forming a hook, as shown in fig. 1, in which hook the fifth-wheel B is placed, the hook thus forming a support for the edge of the wheel.

From the centre of the under side of the axle A, a rod, E, passes to each of the springs F F, the axle A being thus pivoted between the front ends of the rods E E and the hound C by the king-bolt.

Having thus fully described my invention,
What I claim as new, and desire to secure by Letters Patent, is—

The arrangement of the axle A, fifth-wheel B, bar D, rods E E, and springs F F, all substantially as shown and described.

LAWSON G. PEEL.

Witnesses:
J. H. CAWOOD,
JOHN W. CLEMENTS.